(12) United States Patent
Schnackenberg (10) Patent No.: US 6,439,063 B1
(45) Date of Patent: Aug. 27, 2002

(54) WHEEL LOAD TRANSDUCER

(75) Inventor: Joel C. Schnackenberg, Charlevoix, MI (US)

(73) Assignee: Michigan Scientific Corporation, Milford, MI (US)

( * ) Notice: Subject to any disclaimer, the term of this patent is extended or adjusted under 35 U.S.C. 154(b) by 0 days.

(21) Appl. No.: 09/330,951

(22) Filed: Jun. 11, 1999

(51) Int. Cl.$^7$ .................................................. G01D 7/00
(52) U.S. Cl. .................................................. 73/862.041
(58) Field of Search ..................... 73/862.044, 862.041, 73/146, 862.04, 862.631

(56) References Cited

U.S. PATENT DOCUMENTS

| | | | |
|---|---|---|---|
| 3,867,838 A | 2/1975 | Gerresheim | 73/133 R |
| 4,186,596 A | 2/1980 | Bohringer et al. | 73/136 C |
| 4,297,877 A | 11/1981 | Stahl | 73/146 |
| 4,748,844 A | 6/1988 | Yoshikawa et al. | 73/146 |
| 4,821,582 A | * 4/1989 | Meyer et al. | 73/862.04 |
| 5,231,374 A | 7/1993 | Larsen et al. | 340/540 |
| 5,604,317 A | 2/1997 | Jachmann et al. | 73/862.191 |
| 5,817,951 A | * 10/1998 | Cook et al. | 73/862.041 |
| 5,894,094 A | * 4/1999 | Kuchler et al. | 73/862.044 |

* cited by examiner

Primary Examiner—Benjamin R. Fuller
Assistant Examiner—Octavia Davis
(74) Attorney, Agent, or Firm—Young & Basile, P.C.

(57) ABSTRACT

A load transducer for measuring vertical and fore/aft forces on a rotatable vehicle wheel includes a rim adapter attachable to a wheel rim and a hub adapter attachable to a wheel hub. The rim adapter and the hub adapter are connected in a force transmission path. A plurality of beams extend between inner and outer ends of the hub adapter. At least one sensor is mounted on each beam for measuring force exerted on each beam. The sensor may be mounted on the inner and outer surfaces of each beam as well as on the opposed side walls of each beam. The sensors are interconnected in a bridge configuration for generating outputs corresponding to vertical force and fore/aft force exerted upon the wheel. The hub adapter may be formed as a unitary hub adapter and interior load transducer when constructed as a one-piece unitary body. Alternately, the hub adapter may be separate from an interior transducer body and coupled thereto for mounting on different wheel lug bolt configurations and wheel rim/hub dimensions.

10 Claims, 5 Drawing Sheets

WHEEL LOAD TRANSDUCER

CROSS-REFERENCE TO RELATED APPLICATION

This application is related to application Ser. No. 09/244,312, filed Feb. 4, 1999, in the name of Hugh W. Larsen and Carl E. Talaski and entitled "MULTI-AXIS WHEEL LOAD TRANSDUCER", the entire contents of which are incorporated herein by reference.

BACKGROUND OF THE INVENTION

1. Field of the Invention

The present invention relates, in general, to apparatus for measurement of forces and/or moments acting on rotatable members, such as vehicle wheels.

2. Description of the Art

Figure 1:
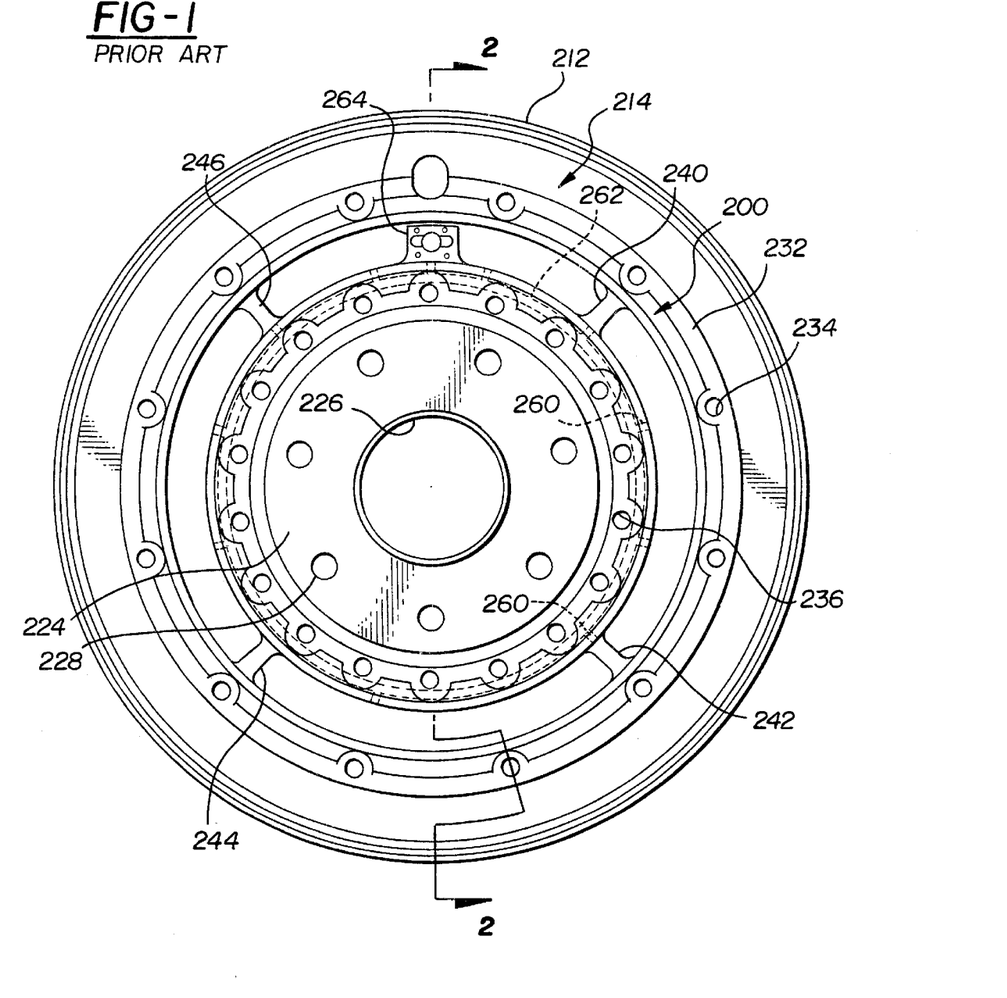
FIG. 1 is a front elevational view of a prior art wheel transducer mounted on a wheel rim.
Figure 2:
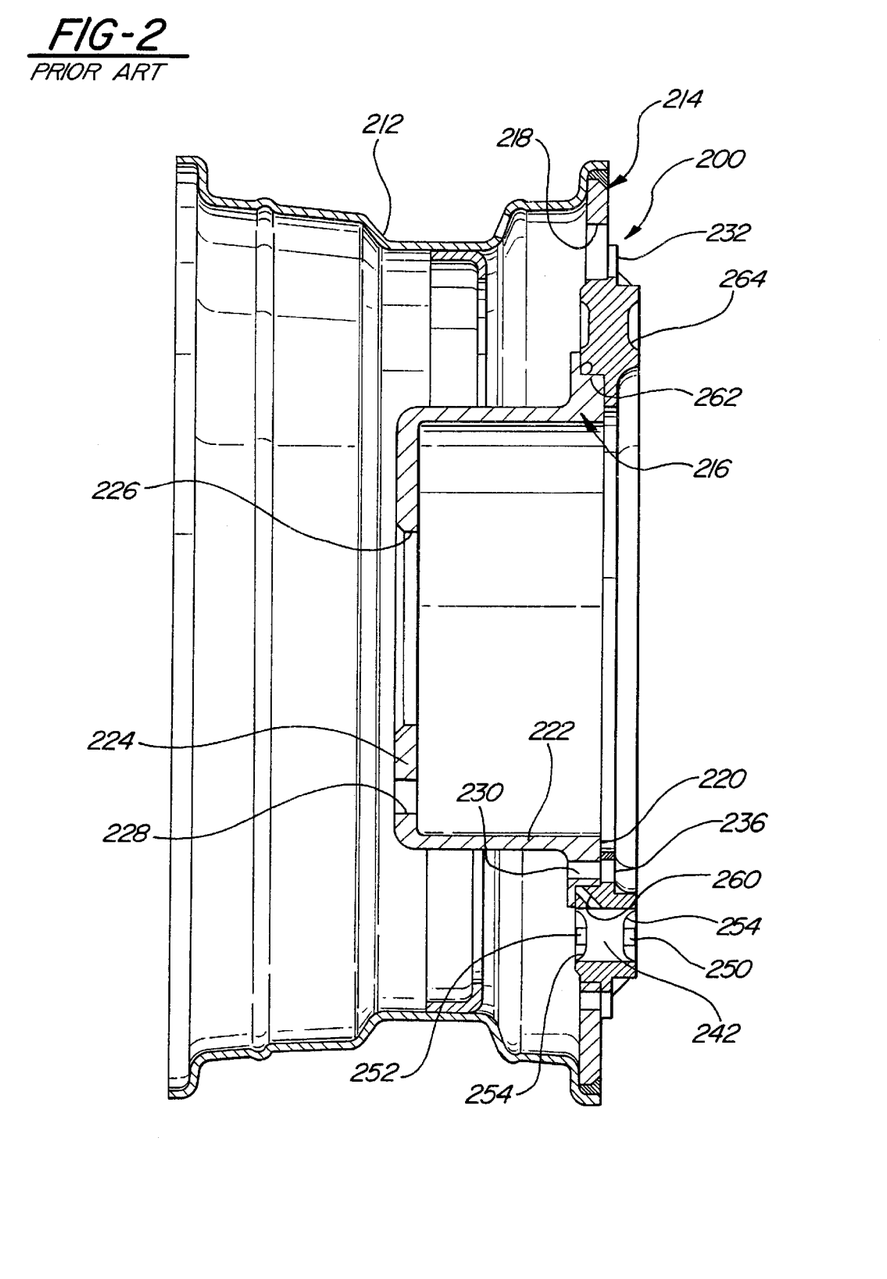
FIG. 2 is a cross-sectional view generally taken along line 2—2 in FIG. 1.

Wheel load transducers are known for attachment to a vehicle wheel to measure torque, moments and forces applied to the wheel. Such transducers, as shown in FIGS. 1 and 2 and described in greater detail hereafter, are typically in the form of an annular member which is affixed at an outer peripheral portion to a rim adapter welded to the wheel rim. The adapter has a plurality of circumferentially spaced apertures which align with corresponding apertures in the outer periphery of the transducer for receiving bolts therethrough to fix to the transducer to the wheel rim.

The transducer includes an inner annular portion which also has a plurality of circumferentially spaced apertures. A hub adapter containing a corresponding circumferential arrangement of apertures is mountable to the inner annular portion and fastened thereto. The hub adapter includes a standard hole arrangement for attachment to a vehicle wheel bolt lugs.

A plurality of radial extending webs or beams interconnect the inner and outer portions of the transducer. Moments and forces exerted on the wheel are measured by sensors, such as strain gages, which are adhesively affixed to exterior surfaces of the webs or beams. Strain gages mounted on the inboard and outboard surfaces of the beams provide torque measurements. Strain gages mounted on the sides of the beams are positioned for providing steering and camber moments and lateral force measurements. This type of transducer is not capable of measuring vertical and fore and aft forces acting on the wheel.

Other more complex transducers are capable of measuring the three directional forces, torque, camber moment and steering moment. However, such wheel load transducers have required many output channels, such as up to twelve output channels to measure the three primary forces and three primary moments or torque exerted on a vehicle wheel.

Thus, it would be desirable to provide a force and/or moment measurement device suitable for use with rotatable members, such as vehicle wheels, which is capable of obtaining force and/or moment measurements with a high degree of accuracy. It would also be desirable to provide such a measurement apparatus which has a minimal number of independent output data channels.

SUMMARY OF THE INVENTION

The present invention is in the load transducer for measuring forces on a rotatable member, such as a vehicle wheel.

According to one aspect of the present invention, the load transducer is mountable on a vehicle wheel having a wheel hub and a rim. The load transducer includes a rim adapter mountable to a wheel rim, and a hub adapter mounted to the wheel hub and fixedly connected in force transmission with the rim adapter.

The hub adapter has inner and outer portions.

A plurality of beams extend between the inner and outer portions of the hub adapter. At least one sensor is mounted on each beam for measuring forces exerted on the beam during rotation of the wheel. The beams are disposed substantially parallel to a rotational axis of the wheel and have an inner surface, an outer surface, and interconnecting, opposed side edges.

An outer annular member is connected between the rim adapter and the hub adapter. The outer annular member includes radially spaced inner and outer annular rings. A plurality of circumferentially spaced beams extend between the inner and outer annular rings.

The beams on the hub adapter are preferably oriented substantially perpendicular to the beams on the outer annular member.

In one aspect, an adapter body has an inner wall with a plurality of circumferentially spaced apertures mountable over vehicle wheel lugs. A side wall extends from the inner wall terminating in an outer end, the plurality of beams are circumferentially spaced about the side wall. The beams comprise at least three circumferentially spaced beams. Each beam has a longitudinal axis, with at least one sensor centered on the longitudinal axis.

In another aspect of the invention, the hub adapter includes a wall having a plurality of circumferentially spaced apertures therein mountable over vehicle wheel lugs and fixedly connectable thereto. A side wall extends from the wall and terminates in an outer end.

A separate interior transducer body has first and second ends. A plurality of bores are formed in the first end and alignable with mating bores in the outer end of the hub adapter for receiving fasteners to fixedly connect the interior transducer body to the hub adapter.

A plurality of bores are formed in the second end of the interior transducer body each receiving a fastener for fixedly connecting the interior transducer body in a force transmission arrangement with the rim adapter. A plurality of spaced beams extend between the first and second ends of the interior transducer body. At least one sensor is mounted on each beam for measuring forces exerted on each beam.

The load transducer of the present invention uniquely and economically enables vertical and longitudinal or fore/aft forces to be measured on a rotating member, such as vehicle wheel, by utilizing the existing hub adapter and rim adapter typically employed in vehicle wheel load transducers which include an outer mounted load transducer capable of measuring torque, lateral force and various moments. Beams are uniquely formed in the hub adapter and provide a mounting surface for sensors, such as strain gages, which can be interconnected in a four arm bridge configuration to provide a single output channel corresponding to vertical force and/or longitudinal or fore/aft force.

The hub adapter may be provided as a combined hub adapter and interior load transducer when constructed as a unitary one-piece member. Alternately, the hub adapter may be provided separate from an interior load transducer body and interconnected to the interior load transducer body in a fixed connection. This arrangement enables an identical interior load transducer to be mated with different hub adapters depending upon a vehicle wheel lug bolt pattern and wheel dimensional configuration.

The beams on the hub adapter or interior load transducer body are configured so that the shear strain per unit force is equal in all strain gage locations in a given bridge circuit. This enables the wheel load transducer of the present invention being insensitive to the load path between the rim and hub adapters. The present wheel load transducer also exhibits minimal radial force variation as the wheel rotates to provide more accurate force measurement.

BRIEF DESCRIPTION OF THE DRAWINGS

The various features, advantages, and other uses of the present invention will become more apparent by referring to the following detailed description and drawing in which.

DESCRIPTION OF THE PREFERRED EMBODIMENT

Before describing the features of the present invention, a description of a prior art load transducer mounted on a motor vehicle wheel will be described for background purposes and to more clearly understand the novel features of the present invention.

As shown in FIGS. 1 and 2, a load transducer 200 is mounted on a wheel rim 212 by means of a rim adapter 214 and on a wheel hub by a hub adapter 216.

The rim adapter 214 is in the form of an annular ring having an outer peripheral edge which is securely fixed, such as by welding to the inner surface of the outer peripheral edge of the rim 12 as shown in FIG. 2. A plurality of circumferentially spaced, internally threaded bores 218 are formed in the rim adapter 214 generally spaced in close proximity to an inner annular edge in the rim adapter 214.

The hub adapter 216 is formed as a one-piece member having an outer peripheral flange 220, an annular side wall 222 and an inner wall 224. A large centrally located aperture 226 is formed in the inner wall 224 to provide access to a vehicle wheel hub, not shown. Further, a plurality of circumferentially spaced, smaller apertures 228 are spaced about the periphery of the inner wall 224 between the central aperture 226 and the annular side wall 224. The apertures 228 are provided in a number and in a circumferential spacing which matches the particular bolt pattern of the vehicle wheel. The apertures 228 are mountable over the vehicle wheel lug bolts secured thereto by means of nuts, not shown, to securely attach the hub adapter 216 to the vehicle wheel hub. A plurality of bores 230 are formed in the peripheral edge or flange 220 of the hub adapter 216.

The load transducer 200 is interposed between and fixedly connected to both of the rim adapter 214 and the hub adapter 216 as shown in FIGS. 1 and 2.

The load transducer 220 is in the form of a unitary, one-piece body or member having an annular flange 232 with a plurality of radially outer apertures 234 which are alignable with the bore 218 in the rim adapter 214. The apertures 234 receive a threaded bolt, not shown, which threadingly engages the bore 218 in the rim adapter 214 to fixedly mount the transducer 200 to the rim adapter 214.

A plurality of radially inner apertures 236 are also formed in the annular ring 232 of the transducer 200 and are alignable with the threaded bores 230 in the hub adapter 216. The apertures 236 likewise receive a threaded bolt, not shown, which threadingly engages the threaded bore 230 in the hub adapter 216 to fixedly mounts the transducer 200 to the hub adapter 216. In this manner, the transducer 200 is fixedly connected in a load and force path between the rim adapter 214 and vehicle wheel rim 212 and between the hub adapter 216 and the vehicle wheel hub, not shown.

A plurality of webs, such as four webs 240, 242, 244 and 246 by way of example only, are unitarily formed between the radially outer portion of the flange 232 and the radially inner portion of the flange 232. The webs 240, 242, 244 and 246 are circumferentially spaced apart, preferably at a ninety degree (90°) spacing by apertures. The thin cross section of each web 240, 242, 244 and 246 is subjected to lateral forces as well as camber and steering moments and driving torque during operation of the vehicle wheel. This force and moments can be measured by mounting sensors, such as strain gages 250 and 252 shown in FIG. 2, on the inner and outer surfaces of each web 240, 242, 244 and 246. The sensors 250 and 252 typically comprise conventional strain gages having a plurality of linear arranged resistor strips disposed in a herringbone pattern at a 90° spacing in opposed pairs. As shown in FIG. 2, the inner and outer surfaces of each web, such as web 240, has a shallow recess 254 formed therein. The recess 254 has a small depth so as to enable each strain gage 250 and 252 to be mounted therein flush with the inner or outer surface of the web to protect the strain gage 250 or 252 from damage.

As also shown FIG. 2, a plurality of small diameter wire bores 260 are formed adjacent to each web 240, 242, 244, and 246 as well as circumferentially about the inner portion of the flange 232. The bores 260 communicate with the apertures between the webs, 240, 242, 244 and 246 and an annular bore 262 formed in the inner portion flange 232. The bores 260 and 262 enable wires from the strain gages mounted on each web 240, 242, 244 and 246 to be routed to an electrical connector 264, such as a multi-pin electrical connector 264, fixedly mounted between the inner and outer portions of the flange 232. The connectors 264, provides output connection to a remote data acquisition unit, not shown.

In use, the strain gages 250 and 252 are mounted at various locations on selected one of the webs 240, 242, 244, and 246 to measure lateral force, driving torque as well as camber moment and steering moment. For example, sensors mounted on the side walls of the webs 242 and 246 may be interconnected into a conventional four arm bridge to provide an output corresponding to steering moment. Similarly, the output of sensors or strain gages 250 and 252 mounted on the side walls of the webs 240 and 244 can be interconnected into a four arm conventional bridge to provide an output corresponding to camber movement. Likewise, sensors or strain gages 250 and 252 mounted on the side walls of all four webs 240, 242, 244 and 246 may be interconnected in a bridge to provide an output corresponding to lateral force exerted on the transducer 200. Finally, strain gages 250 and 252 mounted on the recesses 254 on each web 240, 242, 244 and 246 are interconnected in a conventional bridge to provide an output corresponding to driving torque exerted on the transducer 200.

While the transducer 200 is capable of providing measurement of lateral force, torque, camber moment and steering moment exerted on a vehicle wheel, vertical forces and fore and aft forces were not able to be measured.

Figure 3:
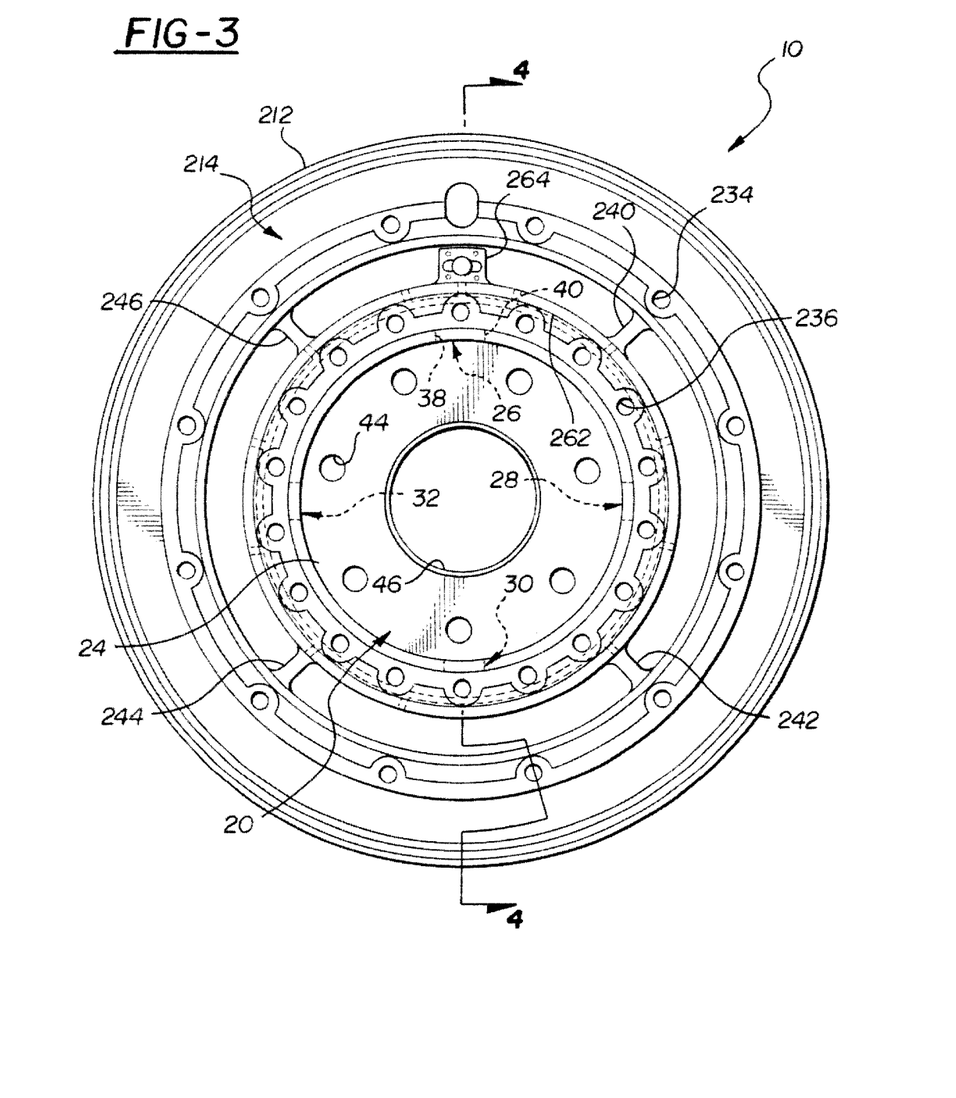
FIG. 3 is a front elevational view of a wheel load transducer constructed in accordance with the teachings of the present invention.
Figure 4:
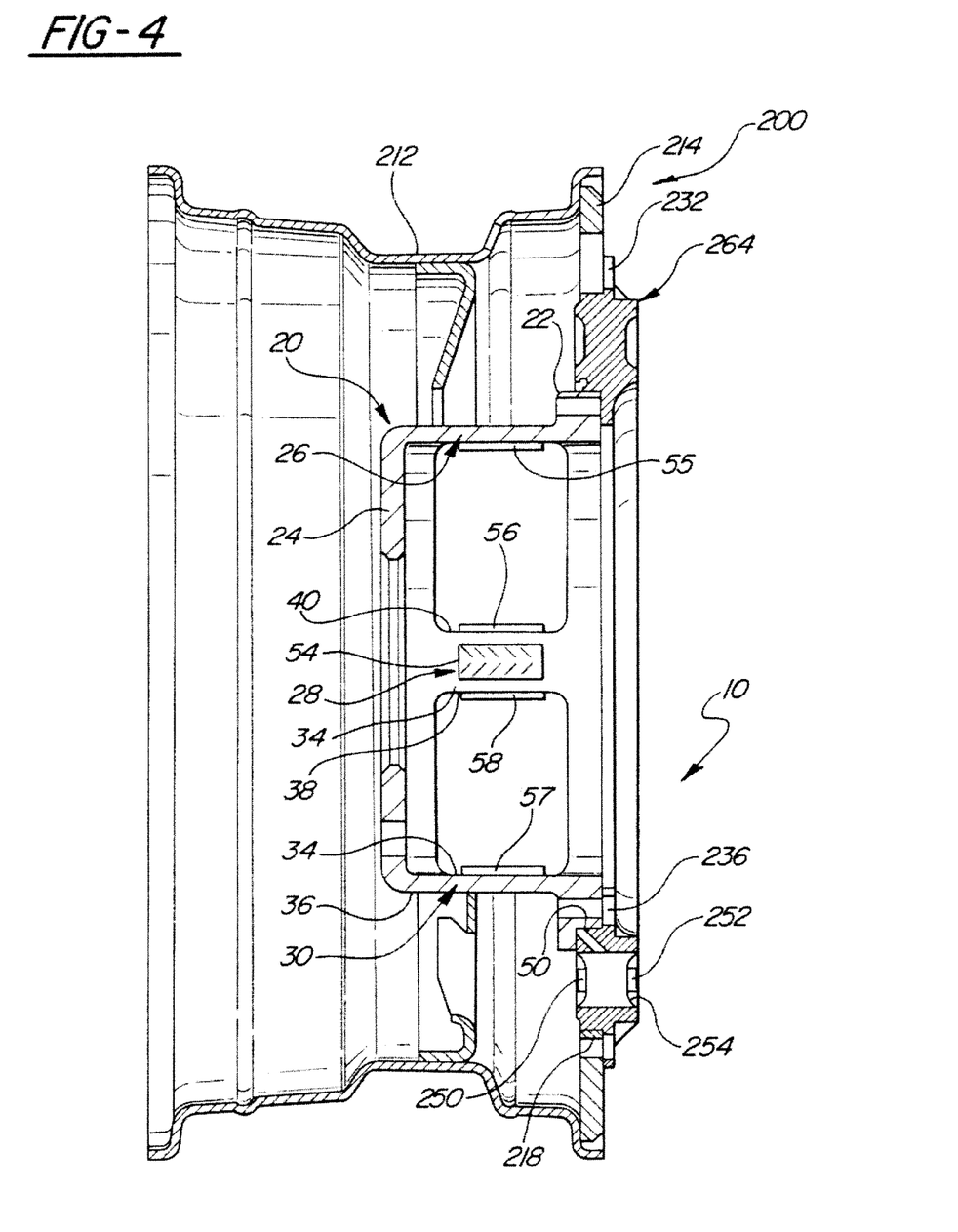
FIG. 4 is a cross-sectional view generally taken along line 4—4 in FIG. 3.
Figure 5:
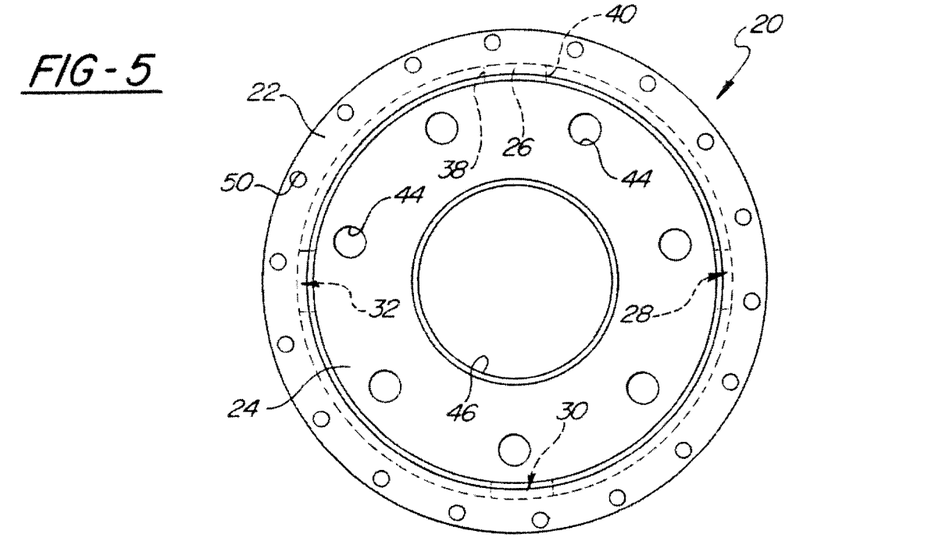
FIG. 5 is an enlarged, front elevational view of the hub adapter shown in FIG. 3.

Referring now to FIGS. 3–5, there is depicted a multi-axis wheel load transducer 10 which is mountable on a wheel rim 12 by a rim adapter 214 and which carries, in one aspect, a combined interior transducer and hub adapter 20 for mounting the entire wheel load transducer 10 on a vehicle wheel hub, not shown.

Although the following description defines the rim adapter 214, the load transducer 10 and the hub adapter 20 as separate members or elements which are fixedly joined together by means of inner connecting fasteners or bolts, it will be understood that this is by example only as the individual elements may be combined into a single, unitary member, such as by forming the rim adapter 214 and the load transducer 10 as a single, unitary member or structure.

Further, since the load transducer 10 includes an outer transducer identical to the load transducer 200 described above and shown in FIGS. 1 and 2, like elements will be depicted with the same reference numeral and the above description of the load transducer 200 will be understood to apply equally to the outer transducer portion of the load transducer 10.

As shown in FIGS. 3 and 4, the transducer 10 includes, in one aspect, a combined inner transducer and hub adapter 20. The transducer/adapter 20 is, in the embodiment shown in FIGS. 3 and 4, formed as a one-piece member having an outer, radially outward extending flange 22, a generally circular inner wall 24, and a plurality of webs or beams interconnecting the outer flange 22 and the inner wall 24. At least three beams are preferred, with four beams 26, 28, 30 and 32 being illustrated by way of example only. Each beam 26, 28, 30 and 32 is in the form of a thin, cross-sectional strip having a radially inner surface 34, a radially outer surface 36 and opposed side edges or walls 38 and 40.

The inner wall 24 has a plurality of circumferentially spaced apertures 44 which are provided in a predetermined number and spacing or arrangement so as to be mountable over a particular pattern of vehicle wheel bolt lugs. Nuts threaded over the lugs mount the combined inner load transducer 10 and hub adapter 20 to the vehicle wheel. A large centrally located aperture 46 is also formed in the inner wall 24 for mounting over a vehicle wheel hub, not shown.

A plurality of apertures or bores 50 are formed in the outer flange 22 and alignable with the bores 236 in the outer load transducer 200 for fixedly coupling the inner transducer/hub adapter 20 to the outer transducer 200.

As shown in FIG. 4, the sensors or strain gages 250 and 252 provided on the various webs 240, 242, 244 and 246 on the outer load transducer 220 can generally be considered to lie in close proximity to the common plane of the load transducer flange 232. The webs 26, 28, 30 and 32 in the inner transducer 10/hub adapter 20 are angularly disposed from the plane of the flange 232 of the outer load transducer 220 and, in an exemplary arrangement, are arranged at a 90° angle from the plane of the flange 232. This enables the sensors or strain gages, to be mounted on at least the radially inner and possibly the radially outer surfaces 34 and 36 of each web 26, 28, 30 and 32 as well as along the side edges 38 and 40 of each web 26, 28, 30 and 32 in order to obtain measurement of vertical and longitudinal fore and aft forces on the wheel. One or more strain gages may be mounted on the surfaces or side edges of each beam 26, 28, 30 and 32.

Preferably, each strain gage is in the form of a series of resistor strips mounted on a thin foil fixed on an insulator backing. A typical strain gage, has two resistor strips arranged in a herringbone pattern 90° from each other. The strain gages are mounted on each beam such that the resistor strips in each strain gage extend substantially 45° with respect to the longitudinal axis extending through each beam.

Each strain gage is fixed to the respective beam surface by means of a high strength adhesive, such as an epoxy. Further, each strain gage is preferably centered on the longitudinal axis of each surface of each beam 26, 28, 30 and 32. In addition, each strain gage will be oriented to be placed in either tension or compression depending upon its mounting location on a particular beam and the desired force to be measured.

The strain gages are connected in a conventional four arm bridge circuit to provide a single channel output for either vertical force or fore/aft force. For example, one pair of radially inner and radially outer sensors or strain gages on two diametrically opposed beams, such as beams 26 and 30, are interconnected along with strain gages mounted on the inner and outer side edges of the diametrically opposed beams 28 and 32 to provide a vertical force measurement.

Similarly, the strain gages on the radially inner and radially outer surfaces of the beams 28 and 32 are interconnected along with the strain gages on the opposed side edges of the opposed beams 26 and 30 to provide fore and aft force measurements.

Each force measurement provided by the strain gages is summed in a four arm bridge to provide a single output channel as described in greater detail in U.S. patent application Ser. No. 09/244,312, the contents of which are incorporated herein in their entirety.

Electrical conductors extending from each strain gage 54, 56 and 58 on the respective beams 26, 28, 30 and 32, as described above, can be routed to the annular recess or groove 262 formed along an inside edge of the outer load transducer 220 as shown in FIG. 3 to the electrical connector 264 mounted on the outer load transducer 220.

The beams 26, 28, 30 and 32 are configured so that the shear strain for unit force is equal at all strain gage locations in a given bridge circuit. This feature makes the inner load transducer 20 insensitive to the load path along each beam. Further, the magnitude of the radial force calculated by combining the vertical and longitudinal forces from the inner load transducer 20 is independent of the direction of the radial force application. This provides minimal radial force variation as the vehicle wheels rotate. Further, the strain gages have equal sensitivity to vertical and longitudinal forces at each beam location.

Figure 7:
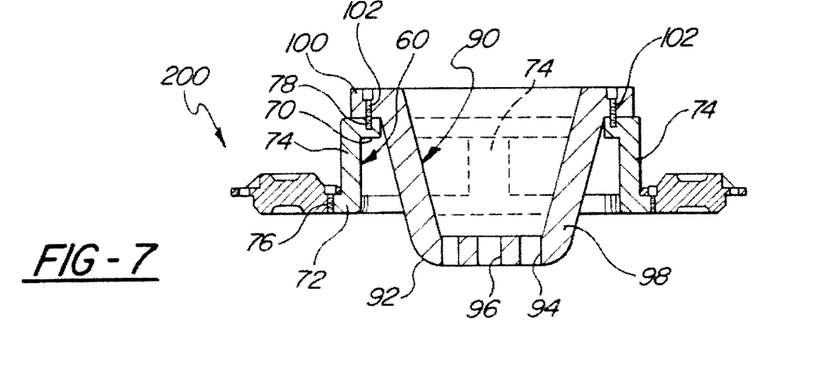
FIG. 7 is a cross-sectional view, similar to FIG. 6, but showing another embodiment of an interior transducer and hub adapter of the invention.

An amplifier and slip ring assembly can also be attached to the outer load transducer 220 as shown in FIGS. 7 and 8 of co-pending application Ser. No. 09/244,312. Briefly, a plurality of amplifier assemblies are mounted on a printed circuit board in a housing for amplifying the output signals of the individual bridges formed of the outputs of the various strain gages on the beams of the inner load transducer 20 and the outer load transducer 220. Further details concerning the construction and function of the amplifiers can be had by referring to U.S. Pat. No. 5,231,374, the entire contents of which are incorporated herein by reference.

As described therein, the outputs of the various amplifiers are connected to a rotatable slip ring coupled to a fixed housing. Output conductors from the housing extend to a connector via a tubular member or conduit which is mounted in a fixed position on the vehicle for carrying the conductors to a data acquisition unit mounted on the vehicle. The tubular member holds the housing in a fixed position relative to the rotating slip ring.

The combined inner load transducer 10 and hub adapter 20 may also be utilized by itself without the outer load transducer 220. In this arrangement or aspect of the present invention, the rim adapter 214 may be extended radially inward from the peripheral edge shown in FIGS. 3 and 4 to align the bores 218 in the rim adapter 214 with the bores 50 in the outer flange 22 of the inner load transducer 10/hub adapter 20 and to fixedly couple the inner load transducer 10/hub adapter 20 to the rim adapter 214.

Figure 6:
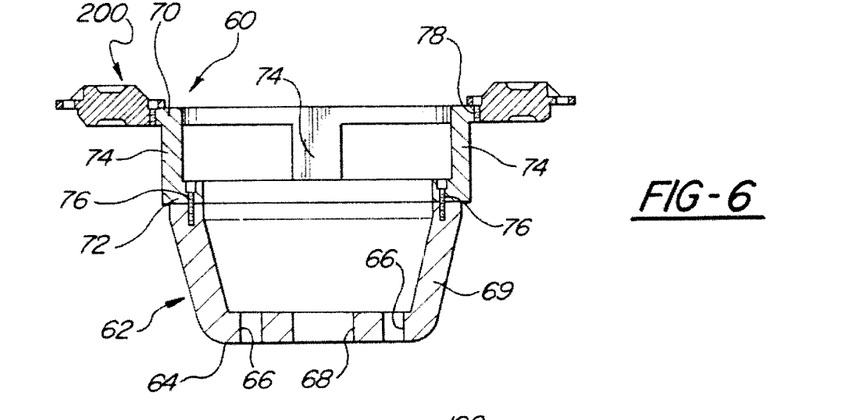
FIG. 6 is a cross-sectional view but showing, similar to FIG. 4, an interior transducer and hub adapter according to another embodiment of the invention.

Referring now to FIGS. 6 and 7, there are depicted alternate embodiments of another aspect of the present invention which enable the interior or inner transducer 60 in FIG. 6 or the interior transducer 60 in FIG. 7 to be identically constructed, yet still be able to be fixedly mounted on different wheels which the bolt lug hole pattern and lug numbers vary or the hub is disclosed inboard or outboard at different positions in different vehicles.

As shown in FIG. 6, a separate hub adapter 62 is formed with an inner wall 64 having a plurality of circumferentially spaced, radially outer disposed bores 66 which receive the vehicle wheel bolt lugs. A larger, centrally located aperture 68 is provided in the inner wall 64 for alignment with a vehicle wheel hub. A side wall 69 extends from the inner wall 64 to an outer end. The side wall 69 is depicted as extending angularly outward from the inner wall 64 by example only.

The interior transducer 60 is formed as a Separate one-piece member having an outer flange 70 and a spaced inner flange 72, all interconnected by a plurality of webs or beams 74, such as at least three webs, with four webs being depicted in FIG. 6 by way of example only.

Threaded bores 76 are provided in the inner flange 72 of the interior transducer 60 and the outer ends of the side wall 69 of the hub adapter 62 and receive a threaded fastener, such as a bolt, for fixedly mounting the interior transducer 60 to the hub adapter 62. A similar plurality of circumferentially spaced threaded bores 78 are formed in the outer flange 70 for receiving a threaded fastener, such a bolt, not shown, for interconnecting the interior transducer 60 to the outer transducer 220, as described above.

FIG. 7 depicts a modification of the embodiment shown in FIG. 6 in which the interior transducer 60 is identical to that depicted in FIG. 6 and described above. However, in this aspect of the present invention, the interior transducer 60 is inverted from the position shown in FIG. 6 such that the threaded bores 76 on the flange 72 are aligned with the bores in the outer transducer 220 to receive a threaded fastener.

A hub adapter 90 is similar to the hub adapter 62 and includes an annular inner wall 92 having a plurality of radially outer disposed bores 94 alignable with a particular vehicle wheel bolt lugs and a large central aperture 96 alignable with the vehicle wheel hub. A side wall 98 which, by example, have a generally conical, angularly outward extending shape, projects from the inner wall 92 and terminates in a radially outward extending flange 100. The side wall 98 and inner wall 92 of hub adapter 90 project through the open central portion of the interior transducer 60. Threaded bores 102 are provided in a spaced circumferential arrangement about the flange 100 and are alignable with the bores 78 in the flange 70 of the interior transducer 60 and receives a threaded fastener to fixedly connect the hub adapter 90 and the interior transducer 60.

In summary, there has been disclosed a load transducer which enables the conventional hub adapter employed in wheel load transducers to be uniquely employed as an inner load transducer to provide vertical and fore/aft force measurements. The inner load transducer and hub adapter may be combined as a unitary, one-piece member or provided as two separate members and interconnected in various configurations to enable easy adaptation to different wheel lug patterns, and different lateral hub positions with respect to the outer wheel rim.

What is claimed is:

1. A load transducer mountable on a rotatable wheel having a wheel hub and a rim, the load transducer comprising:

a rim adapter mountable on said wheel rim;

a hub adapter mounted on said wheel hub and fixedly connected in force transmission with the rim adapter;

the hub adapter having an inner portion and an outer portion, the inner portion having a plurality of apertures mountable over vehicle wheel lugs;

a plurality of beams extending between the inner and outer portions of the hub adapter, the beams angularly disposed with respect to the rim adapter; and at least one sensor mounted on each beam for measuring forces exerted on the beam during rotation of the wheel.

2. The load transducer of claim 1 wherein the beams are disposed substantially parallel to a rotational axis of the wheel.

3. The load transducer of claim 1 wherein each beam comprises:

an inner surface, an outer surface, and opposed side edges.

4. The load transducer of claim 1 further comprising:

an outer annular member fixedly connected between the rim adapter and the hub adapter.

5. The load transducer of claim 4 wherein:

the outer annular member includes radially spaced inner and outer annular rings; and a plurality of circumferentially spaced beams extending between the inner and outer annular rings.

6. The load transducer of claim 5 wherein:

the beams on the hub adapter are oriented substantially perpendicular to the beams on the outer annular member.

7. The load transducer of claim 1 wherein the hub adapter comprises:

a sidewall extending from the inner portion of the hub adapter terminating in an outer end, the plurality of beams circumferentially spaced about the sidewall.

8. The load transducer of claim 1 wherein:

the plural of beams comprises at least three circumferentially spaced beams.

9. The load transducer of claim 1 wherein:

each of the plurality of beams has a longitudinal axis, the at least one sensor centered on the longitudinal axis of at least one beam.

10. The load transducer of claim 1 wherein:

the hub adapter includes a sidewall extending from the inner wall portion and terminating in an outer end;

a transducer body having first and second ends, a plurality of bores formed in the first end and align able with mating bores in the outer end of the hub adapter, each bore receiving a fastener therethrough to fixedly connect the transducer body to the hub adapter;

a plurality of b ores formed in the second end of the transducer body, each receiving a fastener for fixedly connecting the transducer body in force transmission with the rim adapter;

the plurality of spaced beams extending between the first and second ends of the transducer body; and at least one sensor mounted on each beam for measuring force exerted on each beam.

\* \* \* \* \*